US011142050B2

(12) United States Patent
Pompili et al.

(10) Patent No.: US 11,142,050 B2
(45) Date of Patent: Oct. 12, 2021

(54) RIGID TONNEAU COVER

(71) Applicant: BOS Automotive Products, Inc., Rochester Hills, MI (US)

(72) Inventors: William P. Pompili, Shelby Township, MI (US); Edwin Joseph Steinmetz, Fair Haven, MI (US); Jürgen Josef Salewski, Rochester Hills, MI (US)

(73) Assignee: BOS Automotive Products, Inc., Rochester Hills, MI (US)

( * ) Notice: Subject to any disclaimer, the term of this patent is extended or adjusted under 35 U.S.C. 154(b) by 133 days.

(21) Appl. No.: 16/448,981

(22) Filed: Jun. 21, 2019

(65) Prior Publication Data
US 2019/0389287 A1 Dec. 26, 2019

Related U.S. Application Data

(60) Provisional application No. 62/688,178, filed on Jun. 21, 2018.

(51) Int. Cl.
*B60J 7/04* (2006.01)
*B60J 7/19* (2006.01)

(52) U.S. Cl.
CPC .............. *B60J 7/041* (2013.01); *B60J 7/198* (2013.01)

(58) Field of Classification Search
CPC ....... B60J 7/02; B60J 7/028; B60J 7/04; B60J 7/041; B60J 7/0573; B60J 7/14; B60J 7/141; B60J 7/198; B60P 7/02; B60R 5/048
USPC ............ 296/100.02, 100.03, 100.05, 100.06, 296/100.09
See application file for complete search history.

(56) References Cited

U.S. PATENT DOCUMENTS

| | | | |
|---|---|---|---|
| 1,627,716 | A | 5/1927 | Teachout |
| 1,718,183 | A | 6/1929 | Smith |
| 1,969,595 | A | 8/1934 | D'Ornellas |
| 3,488,087 | A | 1/1970 | Cox |

(Continued)

FOREIGN PATENT DOCUMENTS

| | | |
|---|---|---|
| EP | 0427677 A1 | 5/1991 |
| EP | 0834414 A2 | 4/1998 |

(Continued)

OTHER PUBLICATIONS

Non-Final Office Action from U.S. Appl. No. 15/013,352, filed Feb. 2, 2016.

(Continued)

*Primary Examiner* — Jason S Daniels
(74) *Attorney, Agent, or Firm* — Carlson, Gaskey & Olds, P.C.

(57) ABSTRACT

A retractable cover system includes laterally spaced apart guide rails that define an opening and each provide a track. A drive assembly includes a motor that drives a first gear. The first gear is coupled to a second gear. A cover has multiple slats configured to interlock with one another in a deployed configuration. The slats cooperate with the drive assembly and are slidable in the tracks between first and second positions within the opening in response to actuation of the drive assembly. The slats are stacked onto one another in a stowed configuration. The motor is disconnected to the slats with the first and second gears in the decoupled position for manual operation.

19 Claims, 17 Drawing Sheets

(56) References Cited

U.S. PATENT DOCUMENTS

| | | |
|---|---|---|
| 4,210,361 A | 7/1980 | Marvin et al. |
| 4,518,194 A | 5/1985 | Kirkham et al. |
| 4,563,034 A | 1/1986 | Lamb |
| 4,611,848 A | 9/1986 | Romano |
| 4,634,172 A | 1/1987 | Duda |
| 4,786,099 A | 11/1988 | Mount |
| 4,792,178 A | 12/1988 | Kokx |
| 4,889,381 A | 12/1989 | Tamblyn et al. |
| 4,923,240 A | 5/1990 | Swanson |
| 5,040,843 A | 8/1991 | Russell et al. |
| 5,096,250 A | 5/1992 | Menz |
| 5,121,960 A | 6/1992 | Wheatley |
| 5,301,995 A | 4/1994 | Isler |
| 5,330,246 A | 7/1994 | Bernardo |
| 5,375,900 A | 12/1994 | Tessenyi et al. |
| 5,758,921 A | 6/1998 | Hall |
| 5,909,921 A | 6/1999 | Nesbeth |
| 6,000,740 A | 12/1999 | Hall et al. |
| 6,030,021 A | 2/2000 | Ronai |
| 6,053,556 A | 4/2000 | Webb |
| 6,126,226 A | 10/2000 | Wheatley |
| 6,217,102 B1 | 4/2001 | Lathers |
| 6,224,138 B1 | 5/2001 | Adsit et al. |
| 6,234,561 B1 | 5/2001 | Huotari |
| 6,276,735 B1 | 8/2001 | Champion |
| 6,309,005 B1 | 10/2001 | Priest et al. |
| 6,315,346 B1 | 11/2001 | Martin |
| 6,322,129 B2 | 11/2001 | Huotari |
| 6,416,103 B1 | 7/2002 | Laudenbach et al. |
| 6,527,331 B2 | 3/2003 | Searfoss |
| 6,568,739 B1 | 5/2003 | Burch |
| 6,582,007 B2 | 6/2003 | Gothier et al. |
| 6,623,062 B1 | 9/2003 | Hoffman |
| 6,719,353 B1 | 4/2004 | Isler et al. |
| 6,830,281 B2 | 12/2004 | Hoffman |
| 6,846,032 B2 | 1/2005 | de Gaillard et al. |
| 6,893,072 B1 | 5/2005 | Graves |
| 6,929,303 B1 | 8/2005 | Sharples |
| 6,948,760 B2 | 9/2005 | Marx et al. |
| 7,275,779 B2 | 10/2007 | Hebron |
| 7,384,090 B1 | 6/2008 | Weldy |
| 7,445,264 B2 | 11/2008 | Spencer et al. |
| 7,513,562 B2 | 4/2009 | Hardy et al. |
| 7,530,614 B2 | 5/2009 | Nichols |
| 7,568,752 B1 | 8/2009 | Lin |
| 7,815,239 B1 | 10/2010 | Schmeichel et al. |
| 7,946,643 B2 | 5/2011 | Getschel et al. |
| 8,100,615 B1 | 1/2012 | Freeborn |
| 8,186,739 B2 | 5/2012 | Bruestle et al. |
| 8,308,218 B2 | 11/2012 | Kneifl et al. |
| 8,424,951 B1 | 4/2013 | Martin |
| 8,523,266 B2 | 9/2013 | Yue |
| 8,657,358 B2 | 2/2014 | Garska |
| 8,672,388 B2 | 3/2014 | Rusher et al. |
| 8,702,151 B2 | 4/2014 | Mayfield et al. |
| 8,746,321 B2 | 6/2014 | Miller |
| 8,777,293 B2 | 7/2014 | Garska |
| 8,807,624 B2 | 8/2014 | Garska |
| 8,807,625 B2 | 8/2014 | Garska |
| 8,939,494 B2 | 1/2015 | Maimin et al. |
| 9,004,571 B1 | 4/2015 | Bernardo et al. |
| 9,266,416 B1 | 2/2016 | Nania |
| 10,406,896 B2 * | 9/2019 | Ford ................... B60J 7/041 |
| 2004/0212212 A1 | 10/2004 | Spencer et al. |
| 2005/0205221 A1 | 9/2005 | Miller |
| 2007/0056696 A1 | 3/2007 | Lin |
| 2007/0175603 A1 | 8/2007 | Lin |
| 2008/0006373 A1 | 1/2008 | Lin |
| 2008/0211266 A1 | 9/2008 | Bergmiller et al. |
| 2008/0289776 A1 | 11/2008 | Starzmann |
| 2010/0148540 A1 | 6/2010 | Hotta et al. |
| 2011/0232851 A1 | 9/2011 | Uehara et al. |
| 2012/0048489 A1 | 3/2012 | Oh et al. |
| 2012/0049568 A1 | 3/2012 | Wolf et al. |
| 2012/0255690 A1 | 10/2012 | Zeo et al. |
| 2012/0274093 A1 | 11/2012 | Yue |
| 2013/0204461 A1 | 8/2013 | Kartes |
| 2013/0341954 A1 | 12/2013 | Maimin et al. |
| 2013/0341955 A1 | 12/2013 | Garska |
| 2013/0341956 A1 | 12/2013 | Garska |
| 2013/0341957 A1 | 12/2013 | Garska |
| 2013/0341958 A1 | 12/2013 | Mayfield et al. |
| 2013/0341959 A1 | 12/2013 | Garska |
| 2013/0341960 A1 | 12/2013 | Garska |
| 2014/0252794 A1 | 9/2014 | Aho et al. |
| 2016/0236549 A1 | 8/2016 | Stewart et al. |
| 2016/0236552 A1 | 8/2016 | Hannan et al. |
| 2016/0236554 A1 | 8/2016 | Stewart et al. |
| 2016/0280123 A1 | 9/2016 | Rohr et al. |

FOREIGN PATENT DOCUMENTS

| | | |
|---|---|---|
| EP | 2221429 A2 | 8/2010 |
| FR | 2527465 A1 | 12/1983 |
| FR | 2604203 A2 | 3/1988 |
| JP | 2011051528 | 3/2011 |
| WO | 2007082091 | 7/2007 |

OTHER PUBLICATIONS

Non-Final Office Action from U.S. Appl. No. 15/013,363, filed Feb. 2, 2016.

Non-Final Office Action from U.S. Appl. No. 15/013,369, filed on Feb. 2, 2016.

Final Office Action from U.S. Appl. No. 15/013,369, filed Feb. 2, 2016.

Non-Final Office Action from U.S. Appl. No. 15/042,374, filed Feb. 12, 2016.

Non-Final Office Action from U.S. Appl. No. 15/042,358, filed Feb. 12, 2016.

Non-Final Office Action from U.S. Appl. No. 15/042,383, filed Feb. 12, 2016.

Notice of Allowance from U.S. Appl. No. 15/042,383, filed Feb. 12, 2016.

Notice of Allowance from U.S. Appl. No. 15/042,358, filed Feb. 12, 2016.

Notice of Allowance from U.S. Appl. No. 15/042,374, filed Feb. 12, 2016.

International Search Report and Written Opinion for International Application No. PCT/US18/19460 dated Jul. 3, 2018.

\* cited by examiner

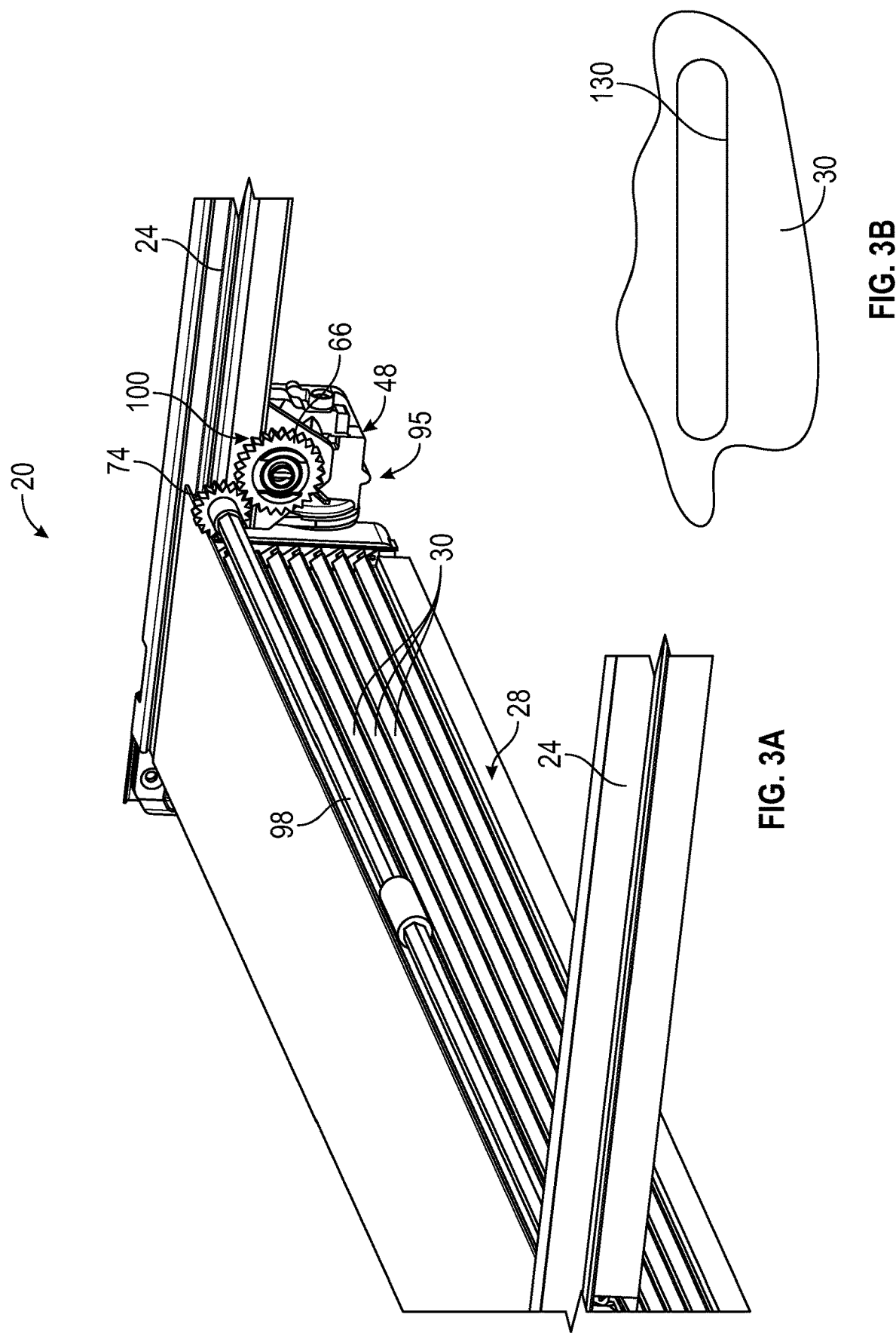

RIGID TONNEAU COVER

CROSS-REFERENCE TO RELATED APPLICATIONS

This application claims priority to U.S. Provisional Application No. 62/688,178, which was filed on Jun. 21, 2018 and is incorporated herein by reference.

BACKGROUND

This disclosure relates to cover systems used, for example, as a tonneau cover of a pickup truck bed. The cover system may also be used, for example, as a roof, sunshade, load floor, or load space cover for vehicle applications, or for non-vehicle applications as well.

Tonneau covers are frequently used to enclose a pickup truck bed. Soft tonneau covers provide the advantage over hard covers of being able to be stowed in a relative small space when the cover is not in use. However, soft tonneau covers do not provide security when closed as the soft cover can be cut to gain access to the truck bed. Prior art hard covers have been heavy and bulky, occupying a significant portion of the truck bed. Moreover, solely manual hard covers are not a desirable option for many customers. What is needed is a motorized rigid tonneau cover that provides security, is compact, weather resistant and sufficiently robust to withstand common load conditions.

SUMMARY

In a featured embodiment, a retractable cover system includes laterally spaced apart guide rails that define an opening and each provide a track. A drive assembly includes a motor that drives a first gear. The first gear is coupled to a second gear. A cover has multiple slats configured to interlock with one another in a deployed configuration. The slats cooperate with the drive assembly and are slidable in the tracks between first and second positions within the opening in response to actuation of the drive assembly. The slats are stacked onto one another in a stowed configuration. One of the first and second gears is axially movable relative to the other of the first and second gears between coupled and decoupled positions. The motor is coupled to the slats with the first and second gears in the coupled position for automated operation. The motor is disconnected to the slats with the first and second gears in the decoupled position for manual operation.

In another embodiment according to the previous embodiment, the second gear is engaged with an underside of the slat. The first gear is axially movable between the coupled and decoupled positions.

In another embodiment according to any of the previous embodiments, the underside includes a finger cup that is configured for use in sliding the slats during manual operation.

In another embodiment according to any of the previous embodiments, the motor is configured to prevent manual operation of the cover with the first and second gears in the coupled position.

In another embodiment according to any of the previous embodiments, the system includes a spacer that is configured to maintain the first gear in the coupled position. The spacer includes a slot that is configured to receive a drive shaft of the motor in an installed position. The slot enables the spacer to be slidingly removed away from the drive shaft to an uninstalled position. The first gear is axially movable to the decoupled position in which the first gear occupies the location wherein the spacer was when in the installed position.

In another embodiment according to any of the previous embodiments, the system includes a release mechanism that cooperates with the drive assembly. The cover is configured to operate manually with the release mechanism in a disengaged position that moves the first and second gears to the decoupled position.

In another embodiment according to any of the previous embodiments, the release mechanism includes a handle that is operatively connected to a lug that supports the first gear on a drive shaft of the motor. The release mechanism is configured to slide the first gear out of engagement with a second gear to the decoupled position in response to an input from the handle.

In another embodiment according to any of the previous embodiments, the release mechanism includes a spring that biases the first gear to the coupled position during automated operation.

In another embodiment according to any of the previous embodiments, the spring engages the handle.

In another embodiment according to any of the previous embodiments, the second gear is axially affixed to a shaft that extends lateral to another second gear that engages the underside of an opposite end of the slat.

In another featured embodiment, a retractable cover system includes laterally spaced apart guide rails that define an opening and each provide a track. A drive assembly includes a motor. A cover has multiple slats that are configured to interlock with one another in a deployed configuration. The slats cooperate with the drive assembly and are slidable in the tracks between first and second positions within the opening in response to actuation of the drive assembly. The slats are stacked onto one another in a stowed configuration. A reinforcing mechanism is movable between locked and unlocked positions. The locked position is configured to interlock adjacent slats to one another.

In another embodiment according to any of the previous embodiments, the adjacent slats have complementarily shaped interlocking profiles. The reinforcing mechanism maintains engagement between the profiles in the locked position.

In another embodiment according to any of the previous embodiments, one of the adjacent slats has a slot. The other of the adjacent slats has a cam that is rotatable about a pivot to be selectively disposed within the slot between the locked and unlocked positions.

In another embodiment according to any of the previous embodiments, the cam is pivotally connected to a rod. The rod is movable in response to an input from an element that cooperates with a rod.

In another embodiment according to any of the previous embodiments, a lever is connected to the rod. The element cooperates with the rod via the lever.

In another embodiment according to any of the previous embodiments, the element is a magnet. The magnet cooperates with the rod to move the cam to the locked position when the slat is aligned with the magnet.

In another embodiment according to any of the previous embodiments, the element is located within the track.

In another embodiment according to any of the previous embodiments, the element is a ramped surface that cooperates with an end of the rod.

In another embodiment according to any of the previous embodiments, a spring returns the reinforcing mechanism from the locked position to the unlocked position.

In another featured embodiment, a retractable cover system includes laterally spaced apart guide rails that define an opening and each provide a track. A drive assembly includes a motor. A cover has multiple slats that are configured to interlock with one another in a deployed configuration. The slats cooperate with the drive assembly and are slidable in the tracks between the first and second positions within the opening in response to actuation of the drive assembly. The slats are stacked onto one another in a stowed configuration. A floor supports a leaf spring that biases the slats upward toward the tracks. A spring-biased pulley system is configured to cooperate with the floor and assist the leaf spring in biasing the slats relative to the tracks.

In another featured embodiment, a retractable cover system includes a magazine. Laterally spaced apart guide rails define an opening and each provide a track. A drive assembly includes a motor. A cover has multiple slats that are configured to interlock with one another in a deployed configuration. The slats cooperate with the drive assembly and are slidable in the tracks between first and second positions within the opening in response to actuation of the drive assembly. The slats are stacked onto one another in a stowed configuration. A roller cooperates with the slat and is configured to orient a top slat at an angle into the magazine to the stowed configuration.

In another embodiment according to any of the previous embodiments, the roller includes an arm that is rotationally biased to an extended position by a spring.

In another embodiment according to any of the previous embodiments, the slat includes a ramped surface that provides a recess that enables the roller to reach the extended position. Movement of the top slat into the housing forces the slat downward into the magazine.

In another embodiment according to any of the previous embodiments, movement of the top slat out of the magazine overcomes the spring and pushes the roller to a stowed position to permit a generally horizontal orientation of the top slat.

In another embodiment according to any of the previous embodiments, complementarily shaped interlocking profiles of adjacent slats, which include the top slat, are broken.

BRIEF DESCRIPTION OF THE DRAWINGS

The disclosure can be further understood by reference to the following detailed description when considered in connection with the accompanying drawings wherein:

FIG. 3A illustrates an example drive assembly for the cover system.

FIG. 3B illustrates a finger cup on an underside of one of the slats.

DETAILED DESCRIPTION

This disclosure relates to a motorized, rigid cover system for use in a variety of applications. In one example, the cover system may be used as a tonneau cover to selectively provide access to a vehicle truck bed in both automated and manual modes of operation. This disclosure incorporates by reference in their entirety the following applications: U.S. Provisional Application No. 62/462,971, which was filed on Feb. 24, 2017, U.S. Provisional Application No. 62/491,055, which was filed on Apr. 27, 2017, and U.S. Provisional Application No. 62/526,872, which was filed on Jun. 29, 2017, and International Application No PCT/US18/19460, which was filed on Feb. 23, 2018.

Figure 1:
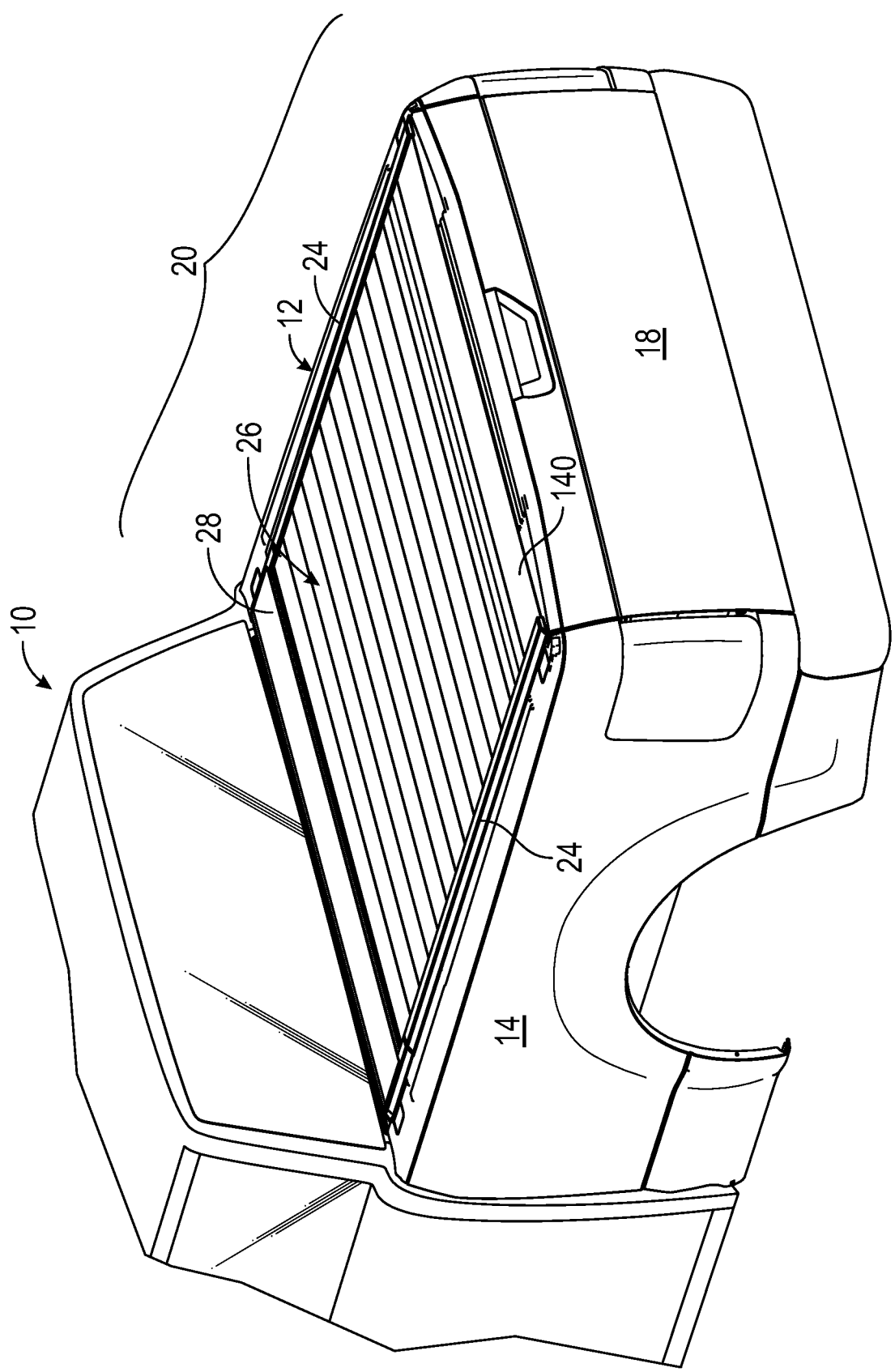
FIG. 1 illustrates a pickup truck with an example cover system having a rigid cover with multiple slats in a closed position with respect to a truck bed.
Figure 2:
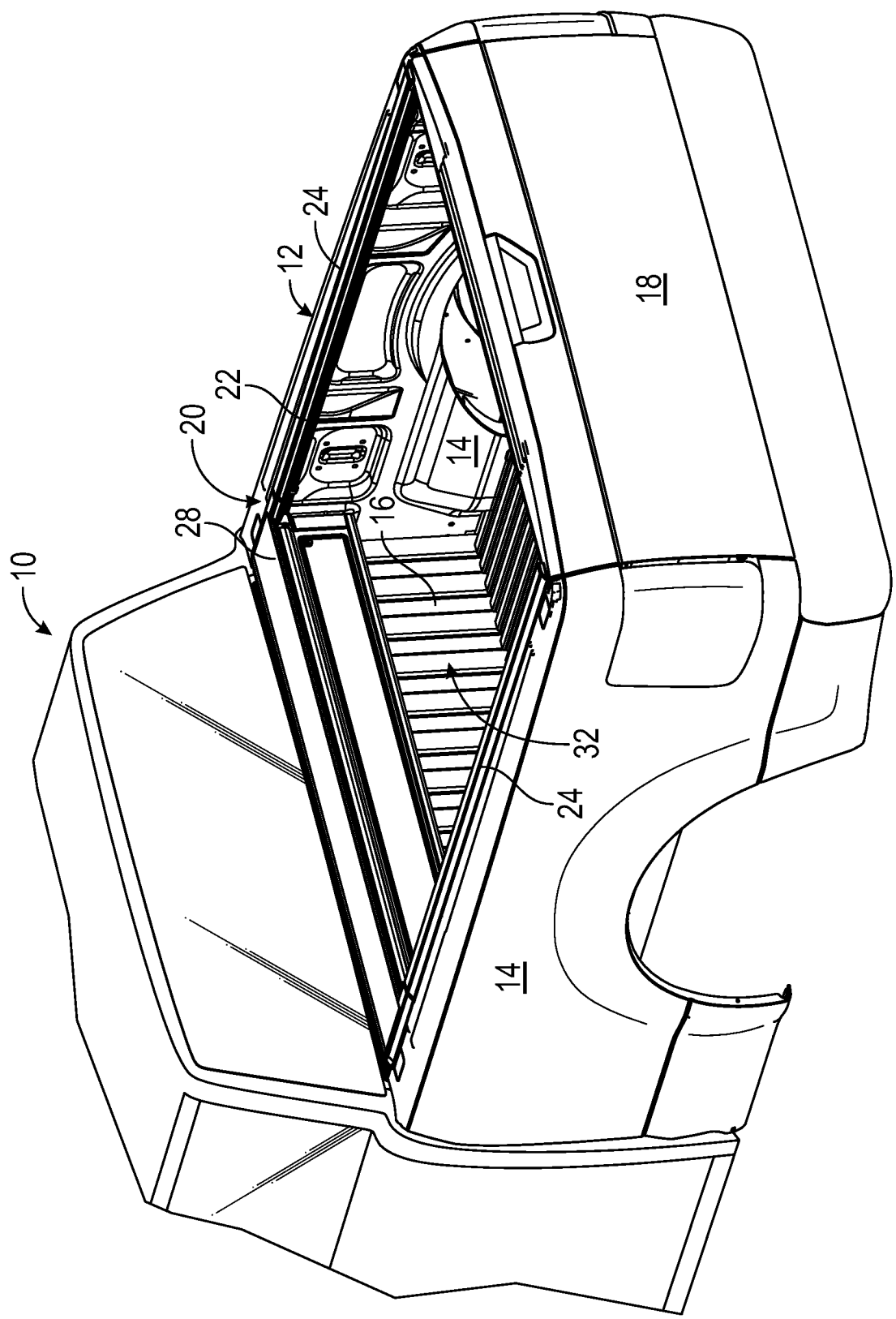
FIG. 2 depicts the cover of the cover system in an open position.

A vehicle 10 is schematically illustrated in FIGS. 1-3. The vehicle 10 includes a truck bed 12 having lateral sides 14 and a front wall 16. A tailgate 18 is typically pivotally attached to a rear of the truck bed 12. A cover system 20 is mounted to the top of the truck bed 12, for example, and has a rigid cover 26 that is moveable between a closed position (FIG. 1) and an open position (FIG. 2), including partially open positions in between. If desired, the cover system 20 can be moved between an infinite number of positions between the closed and open positions.

The cover system 20 includes a frame about the truck bed opening provided by laterally spaced apart guide rails 24, which may be provided by aluminum extrusions of various possible shapes. The guide rails 24 define a path alone which the cover 26 moves and are secured to the lateral sides 14 of the truck bed 12. The cover 26, or hard tonneau cover, which may be constructed from multiple interlocking slats 30, is supported by and can slide along tracks 22 within the guide rails 24.

A drive assembly 95 including an electric motor 48 (FIG. 3A) slides the slats 30 between the open and closed positions along a path provided by the tracks 22 in an automated mode of operation. A release mechanism 100 may be used to decouple the motor 48 so the slats 30 can be more easily moved manually. The slats 30 interlock with one another as the cover 26 is deployed over the truck bed. The slats 30 are decoupled from one another and stored within a magazine 28 when the cover 26 is retracted.

A magazine 28 is mounted near the front wall 16 and houses the slats 30 in a stacked relationship when the cover 26 is not fully deployed. The magazine 28 is spaced from the truck bed floor, which provides a space 32 that can accommodate cargo when the magazine 28 is installed in the truck bed 12. The magazine 28 is easily removable from the truck bed 12 to increase storage space. For simplicity, the cover system 20 is designed so that the guide rails 24 may remain secured to the truck bed 12 when the magazine 28 is removed.

FIGS. 3A-4D illustrate a release mechanism 100 for a cover system 20. A motor 48 electrically drives multiple slats 30 along a pair of spaced apart guide rails 24. The motor 48 rotationally drives a first gear, or motor gear 66, that is selectively coupled to a second gear, or drive gear 74. Fewer or additional gears may be used if desired. The slats 30 include a slide on each of its opposing ends that ride within its respective rail 24. A shaft 98 interconnects laterally spaced apart drive gears 74 that cooperate with teeth on the underside of the slides of the slats 30. In the example, the drive gears 74 are axially affixed to the shaft 98 and rotationally affixed by profile 416 (FIG. 4B). An end of the shaft 98 is mounted in a collar 414 on an end cap 412 at each side of the magazine 28. The motor 48 is secured to the end cap 412.

With the gears coupled to one another, the motor 48 may be difficult to back-drive, or the motor 48 may also effectively lock against rotation acting as a security feature. The release mechanism 100 can be operated in a variety of ways to decouple the motor gear 66 from the drive gear 74 so that the slats 30 can be manually opened or closed more easily, for example, during an anti-entrapment scenario in which a person is within the enclosed truck bed with the electric motor inoperable. In such instances, the release mechanism 100 is actuated, decoupling the motor 48 from the slats 30. One or more finger cups 130 may be provided on an underside of the slats 30, as shown in FIG. 3B, enabling a person within the truck bed to slide the slats 30 once the slats have been decoupled from the motor 48.

The release mechanism 100 includes a drive lug 400 mounted to a drive shaft 148 of the motor 48. A driven lug 402 rotationally affixes the motor gear 66 to the drive lug 400. Legs 410 of the driven lug 402 are snap-fit into correspondingly shaped recesses 406 in the drive lug 400. The motor gear 66 includes channels 408 that permit sliding movement of the motor gear 66 along the rotational axis of the drive lug 400.

Figure 4A:
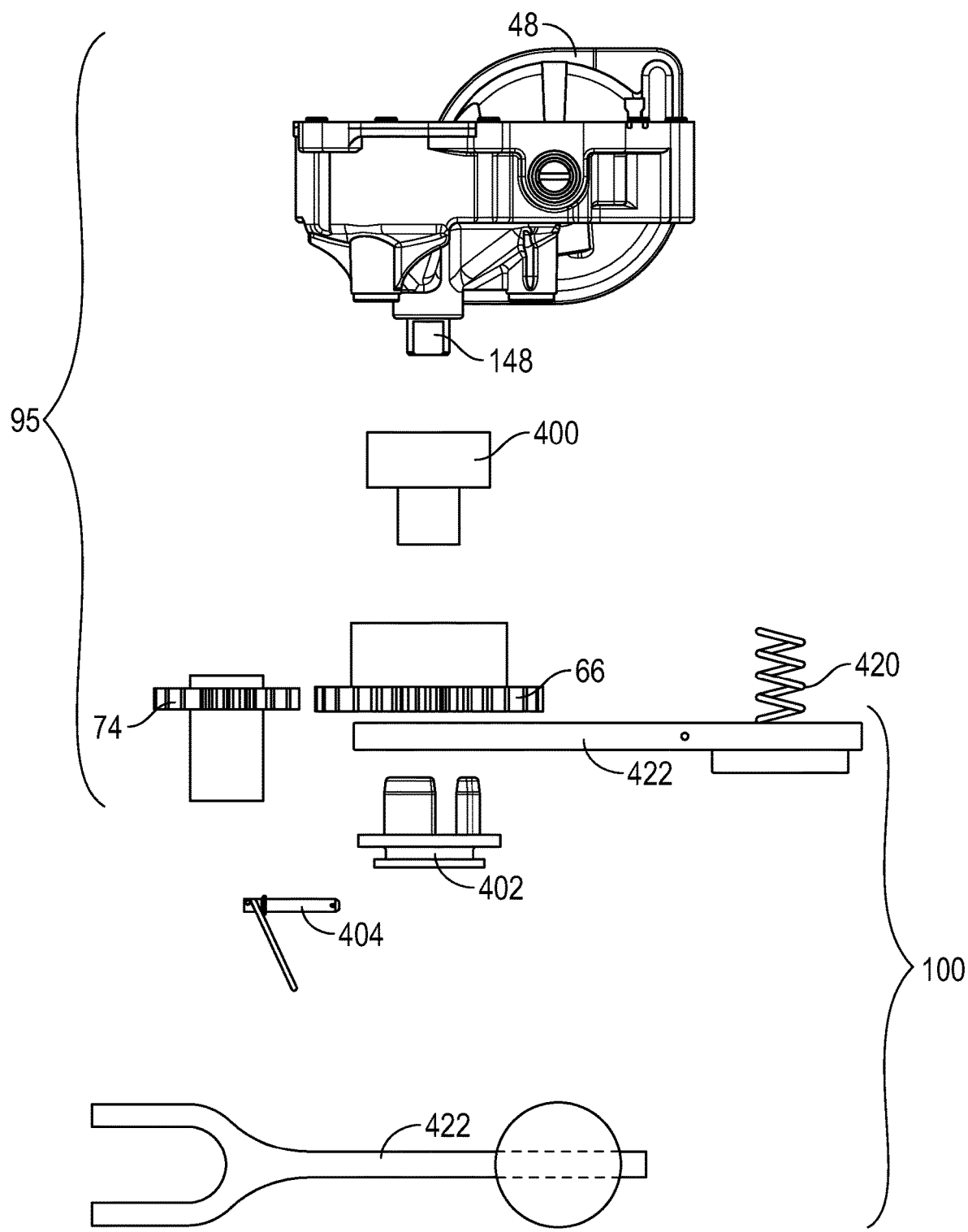
FIG. 4A illustrates an exploded view for an example release mechanism.
Figure 4B:
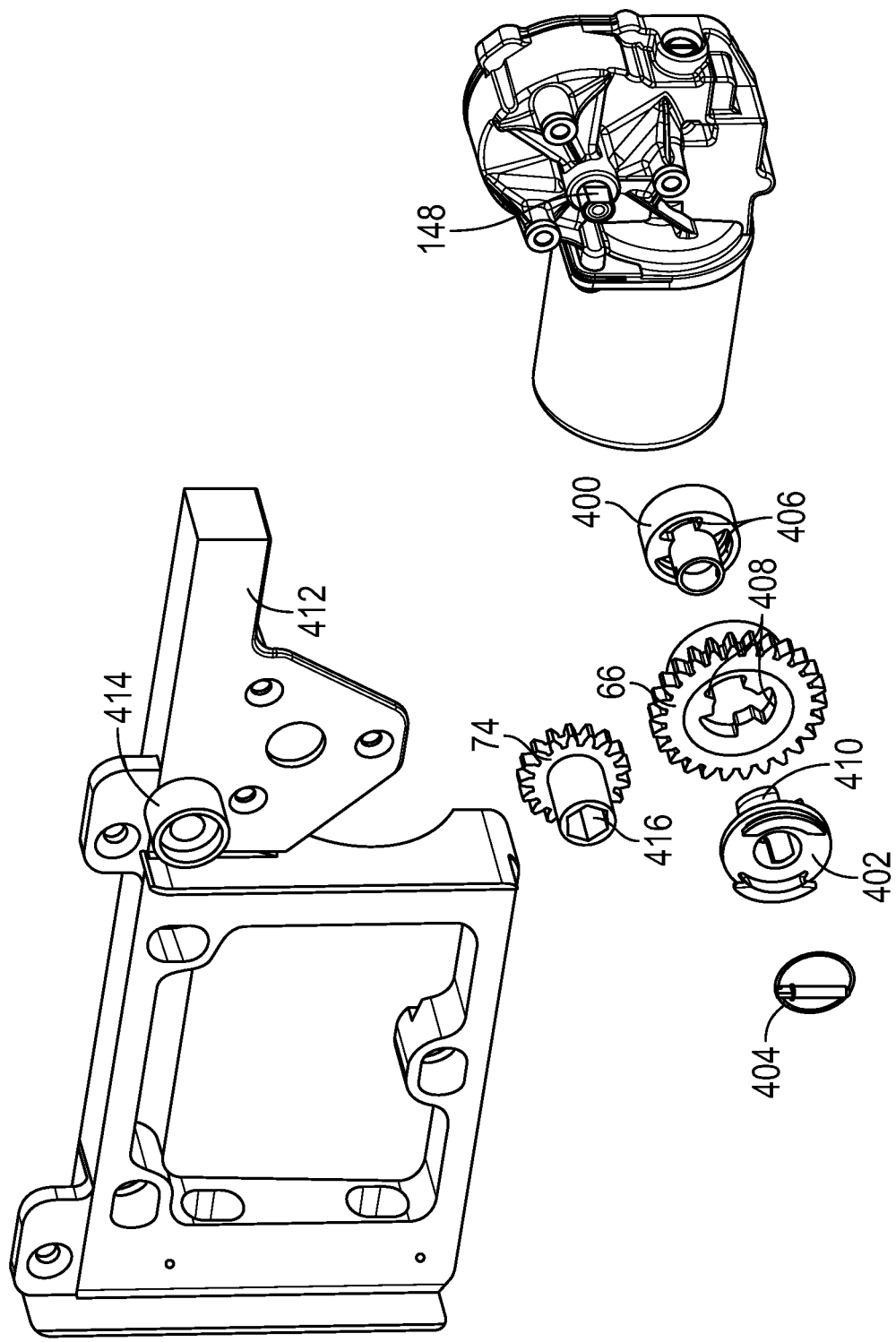
FIG. 4B is a perspective exploded view illustrating the drive assembly with a portion of the release mechanism.
Figure 4C:
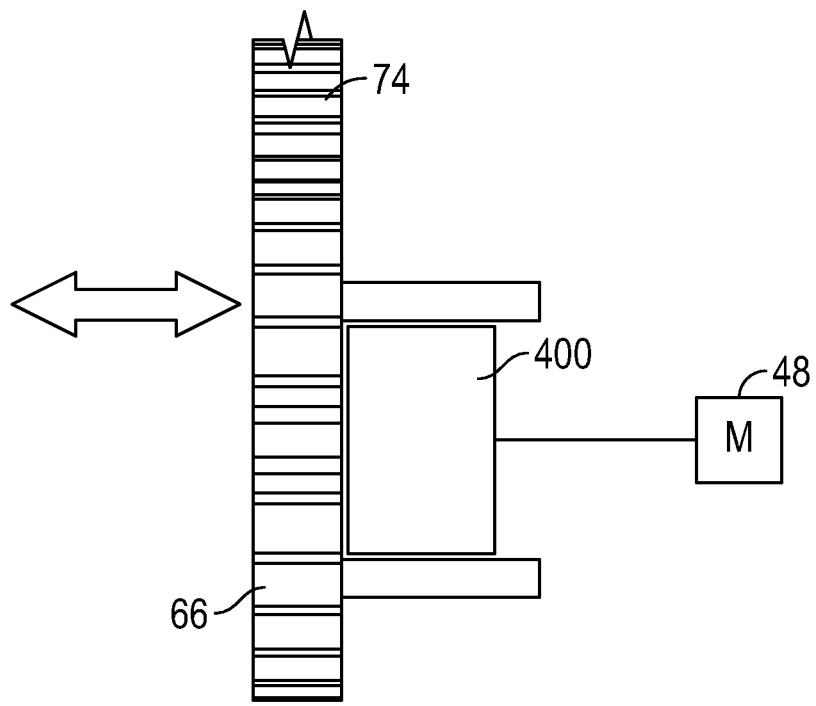
FIG. 4C illustrates a set of gears of the drive assembly engaged with one another in a coupled position.
Figure 4D:
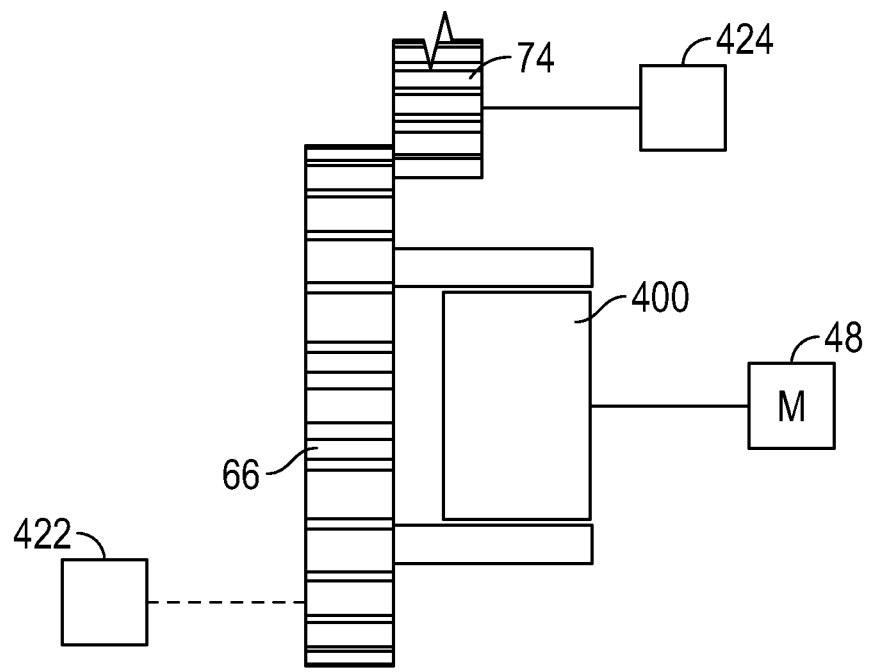
FIG. 4D illustrates the gears shown in FIG. 4C decoupled by the release mechanism.
Figure 5A:
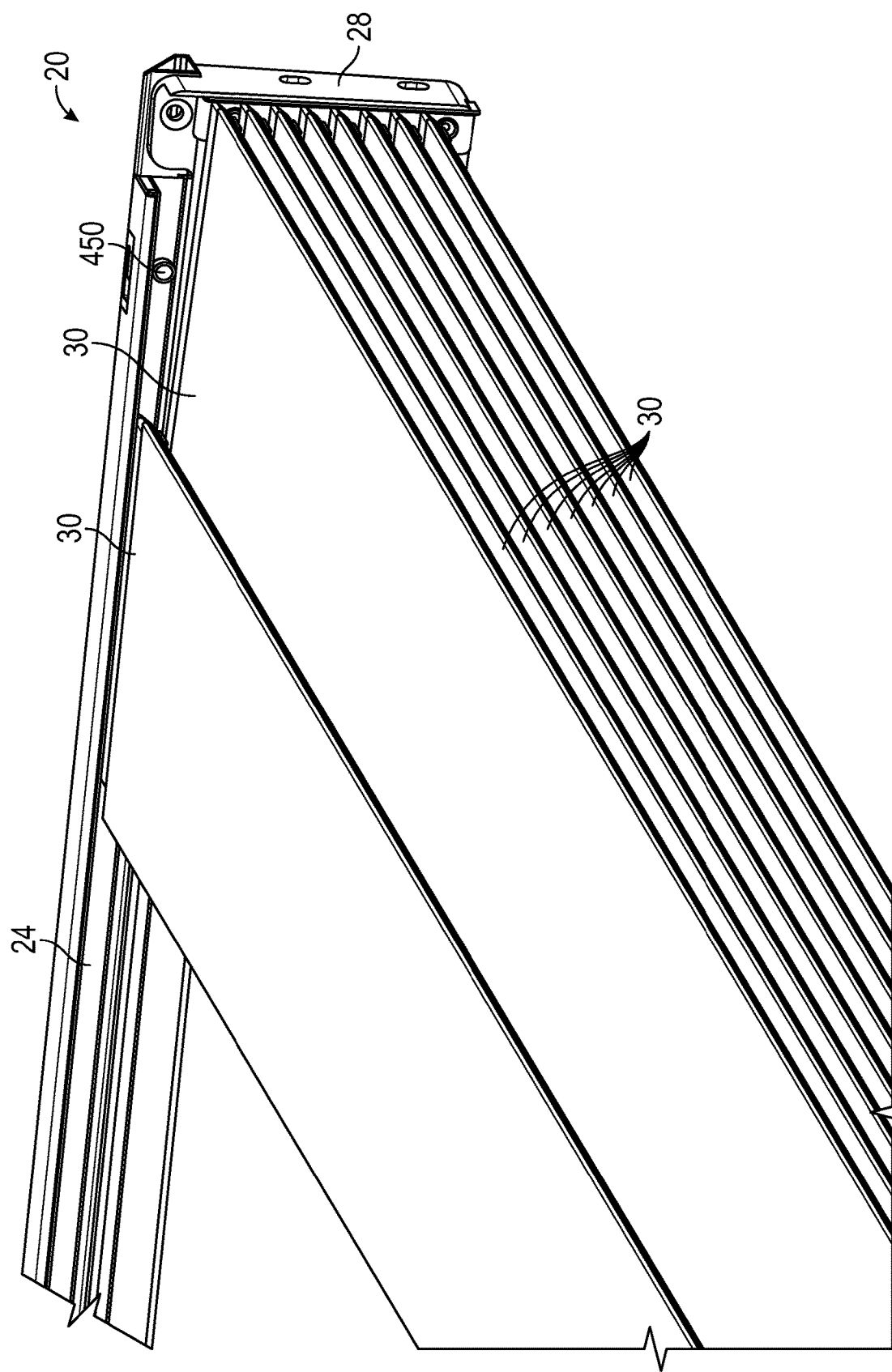
FIG. 5A depicts numerous slats stowed in a magazine.
Figure 5B:
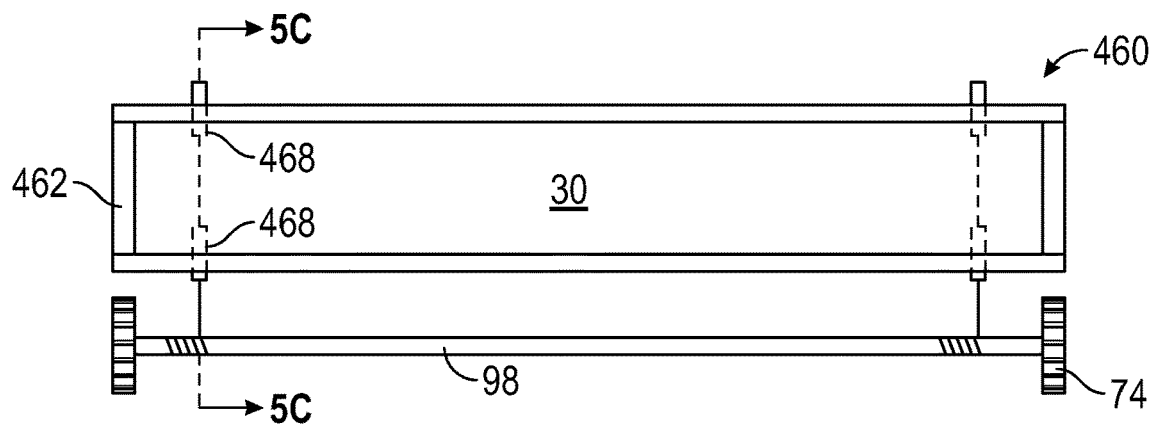
FIG. 5B illustrates an example pulley system for assisting in raising the slats.
Figure 5C:
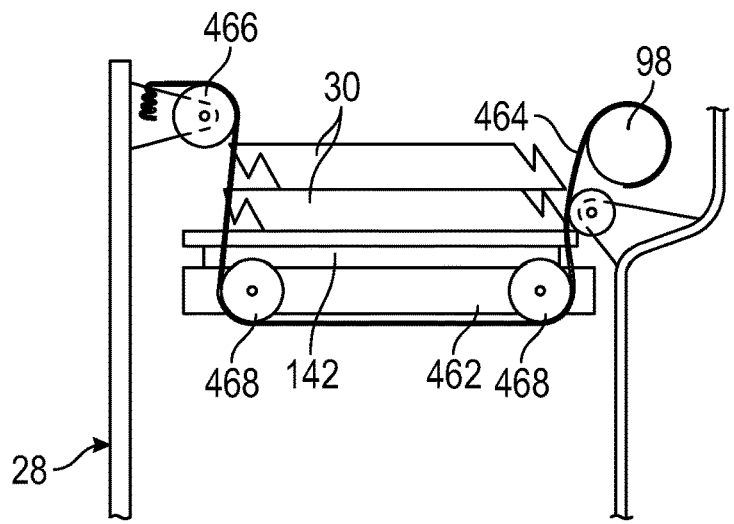
FIG. 5C is a schematic cross-sectional view of the pulley system shown in FIG. 5B taken along line 5C-5C.
Figure 5D:
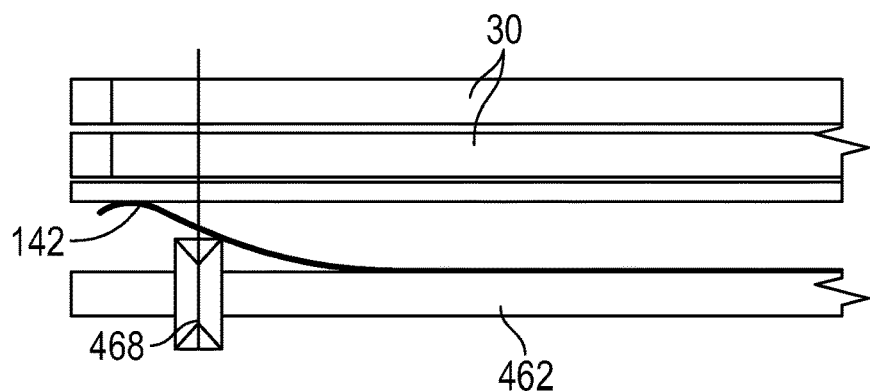
FIG. 5D is another schematic view of the pulley system also depicting a leaf spring.

In a normal operating configuration shown in FIG. 4C, the motor gear 66 is in engagement with the drive gear 74. A retainer 404 prevents further axially outward movement of the motor gear 66 with respect to the drive lug 400. By depressing the driven lug 402 with a device 422, such as a handle, the motor gear 66 can be decoupled from the drive gear 74, as shown in FIG. 4D. In this disengaged position, the slats 30 may be manually operated. A spring 420 biases the motor gear 66 via the device 422 to a location at which it is in engagement with the drive gear 74. One end of the handle includes a fork that is received in an annular slot in the driven lug 402; an opposite end of the handle has a palm pad that can be pushed by a user. The device 422 may be configured to decouple the motor gear 66 from the drive gear 74 remotely. A retracting device, such as a drill motor 424, may be used to retract the slats 30 without the motor 48, for example, if the automated drive malfunctions.

Referring to FIGS. 5A-5D, the spring 142 (e.g., a pair of leaf springs) that biases the slats 30 upward to be deployed, may be difficult to overcome when inserting the slats 30 back into the magazine 28 either manually or when electrically automated. To this end, a pulley system 460 may be used to assist in raising and lowering the slats 30. In one example, a cable 464 is operably connected to the shaft 98. A follower 462 that supports the slats 30 within the magazine 28 includes pulleys 468 about which the cable 464 is wrapped. An opposite end of the cable 464 may be secured to a pulley 466. As the toothed features of the underside of the slats 30 cooperate with the drive gear 74 on the shaft 98, the cable 464 is wound or unwound about the shaft 98, thereby assisting the raising or lowering of the follower 462 via the pulleys 468.

Figure 6:
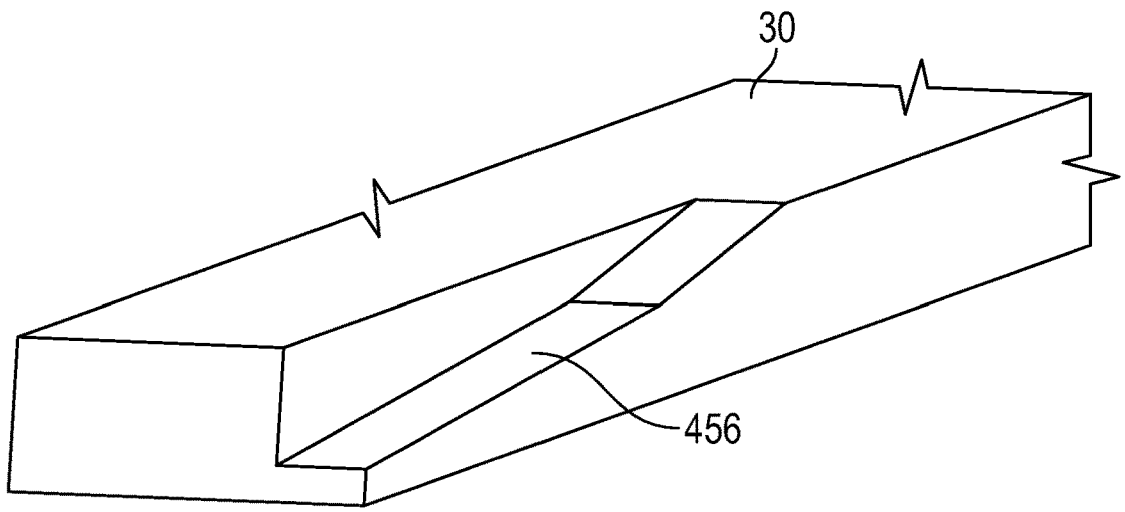
FIG. 6 shows a ramped surface on one of the slats.
Figure 7A:
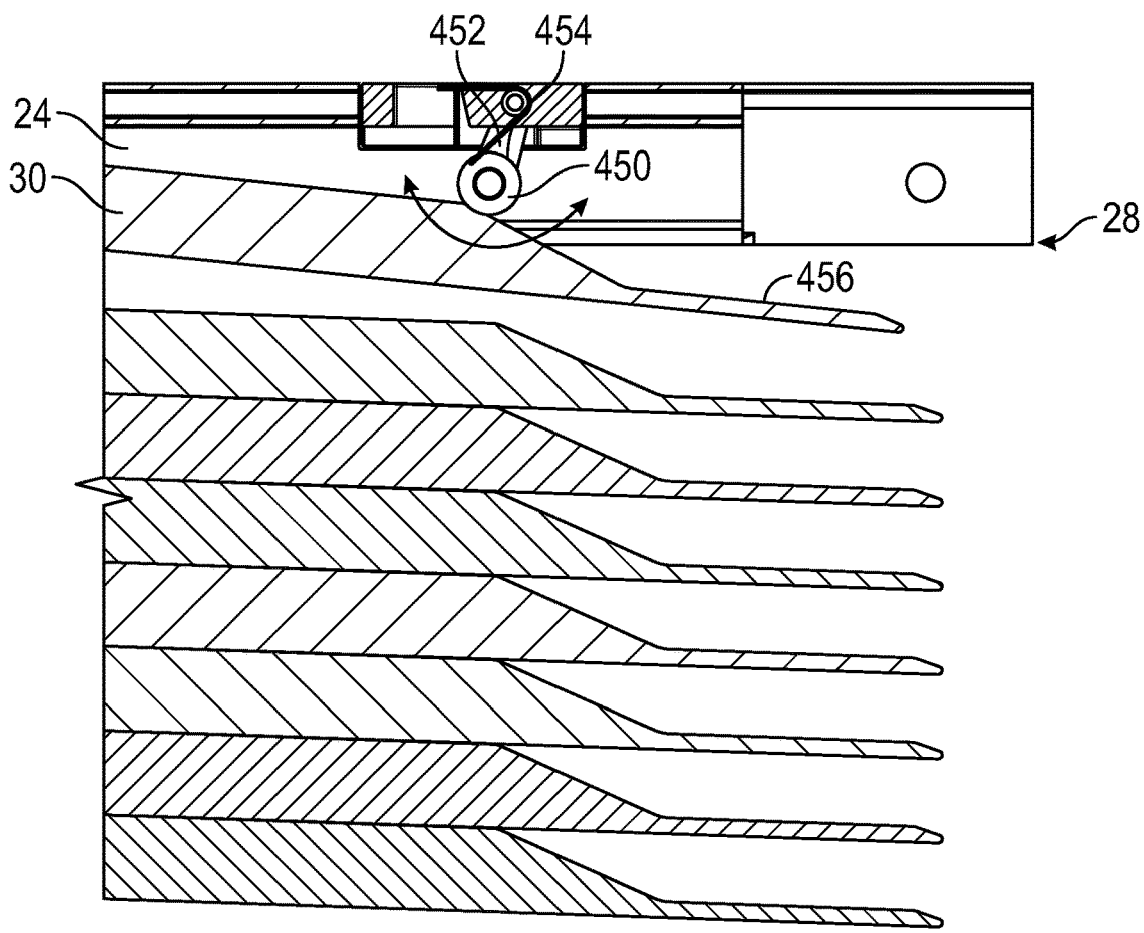
FIG. 7A illustrates a roller engaging the ramped surface in a first position.
Figure 7B:
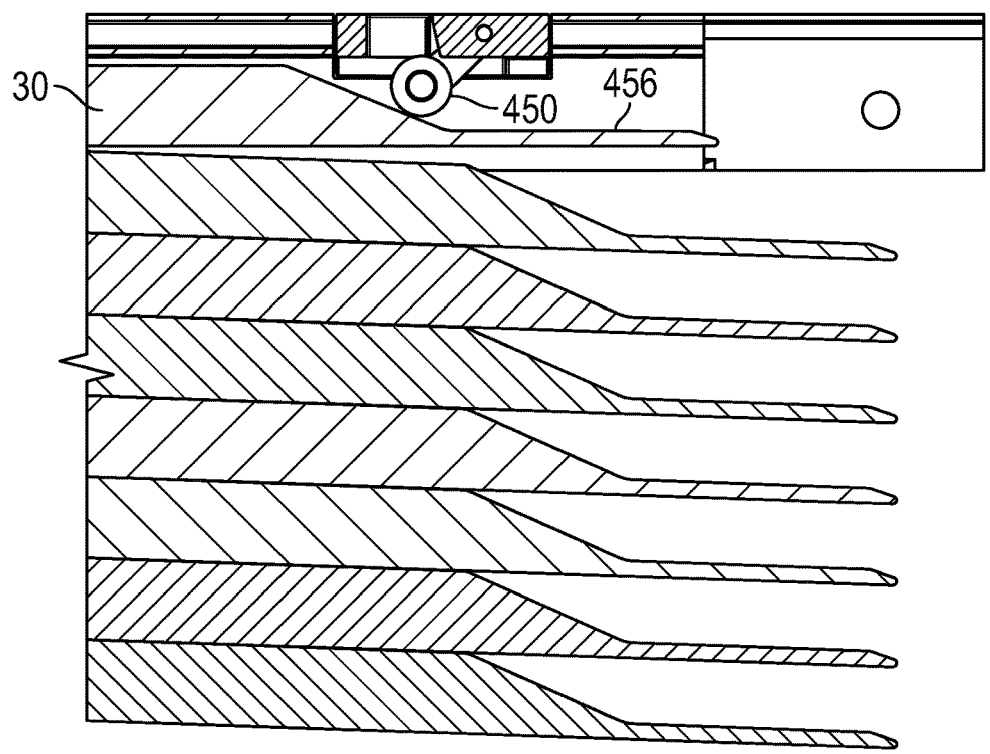
FIG. 7B illustrates the roller and ramped surface in a second position.
Figure 7C:
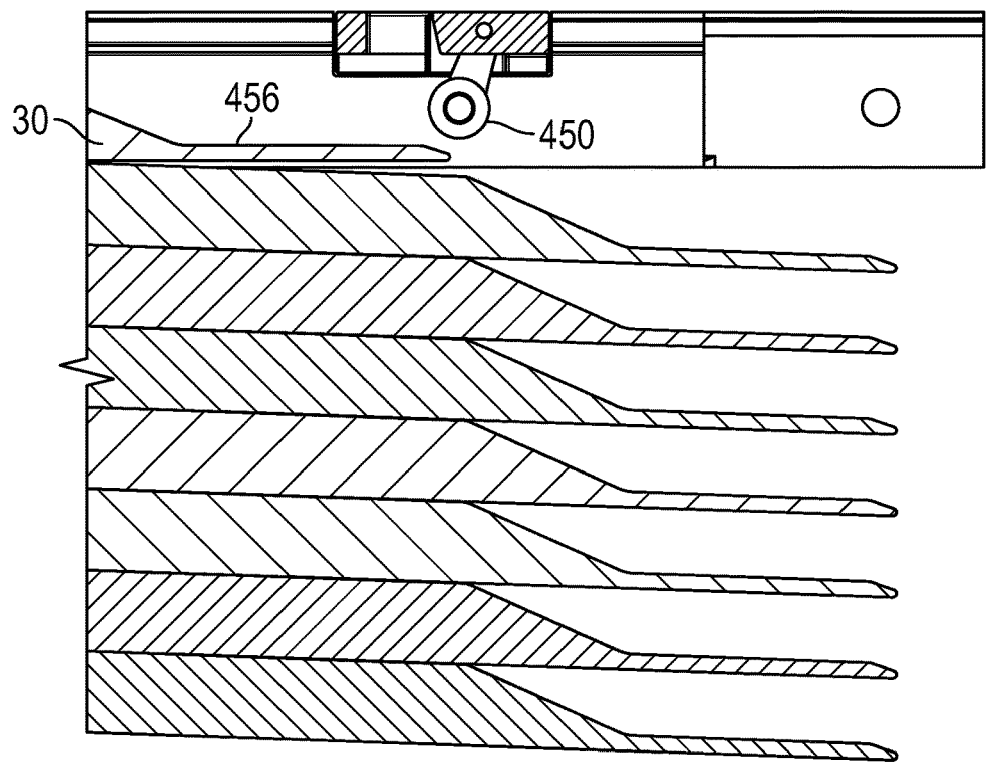
FIG. 7C illustrates the roller and the ramped surface in a third position.
Figure 7D:
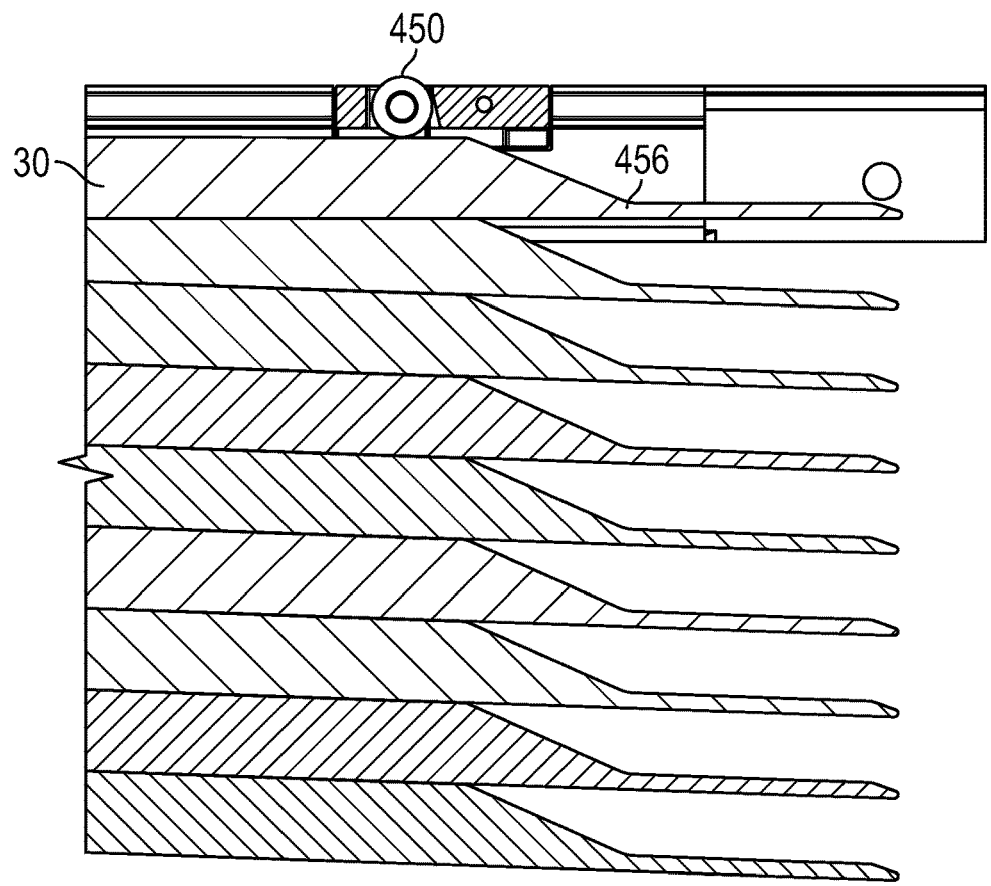
FIG. 7D illustrates the roller and ramped surface in a fourth position.

Referring to FIGS. 6-7D, a slat orienting mechanism is shown. The slats 30 include interlocking profiles that engage one another to form a solid cover. A mechanism includes a roller 450 mounted to an arm 452 that is rotationally biased to an extended position by a spring 454. In the extended position (FIG. 7C), the arm 452 is at an angle such that as a slat 30 is moved into the magazine 28, the arm 452 is urged to the extended position, preventing the roller 450 from being folded to a stowed position (FIG. 7D). By way of contrast, when the slat 30 is moved out of the magazine 28, the arm 452 is encouraged to move toward the stowed position in which the spring 54 is overcome, as illustrated in FIG. 7D.

In operation, the roller 450 cooperates with a ramped surface 456 on the slat 30. In this manner, the slat 30 is urged to an angled position (FIG. 7A) when being inserted into the magazine 28, which helps break the connection between the interlocking profiles of the adjacent slats. By way of contrast, as the slats 30 are moving out of the magazine 28 (sequentially FIG. 7B, then FIG. 7C), the slats 30 are in a generally horizontal orientation, which better enables the interlocking profiles to firmly interconnect and seat with respect to one another.

Figure 8A:
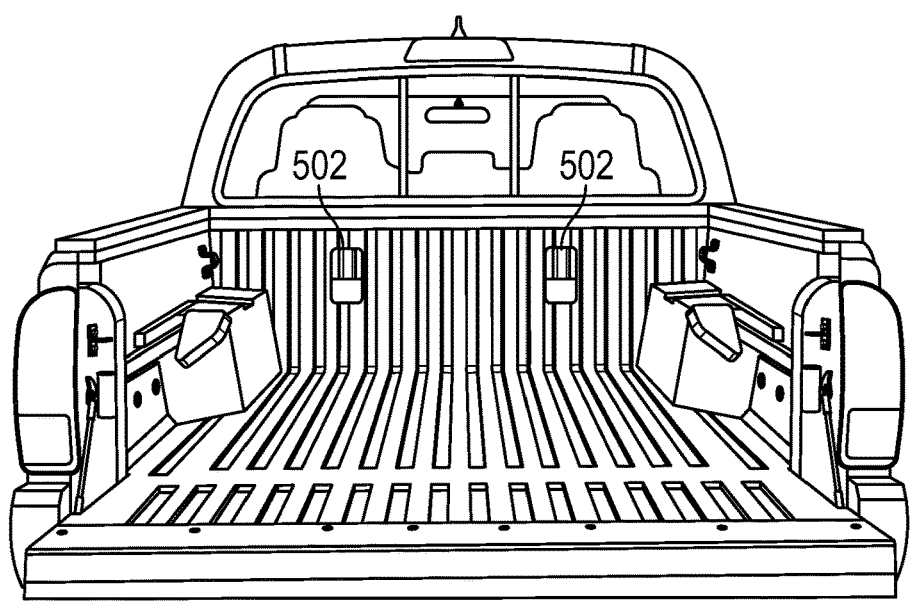
FIG. 8A illustrates mounting brackets for supporting the magazine within a truck bed.
Figure 8B:
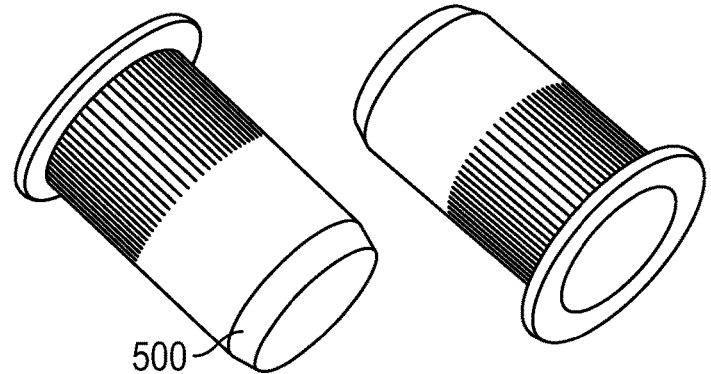
FIGS. 8B and 8C respectively illustrate rivet nuts and the mounting brackets.
Figure 8C:
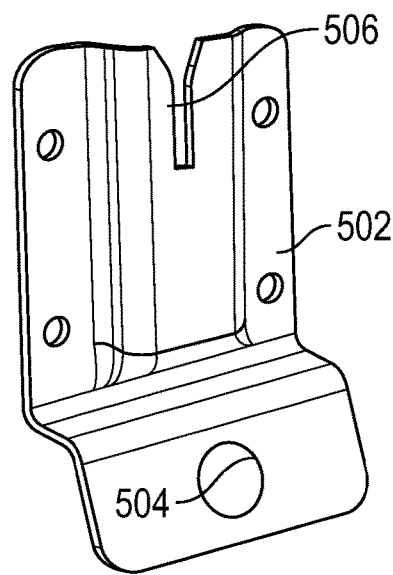
Figure 8D:
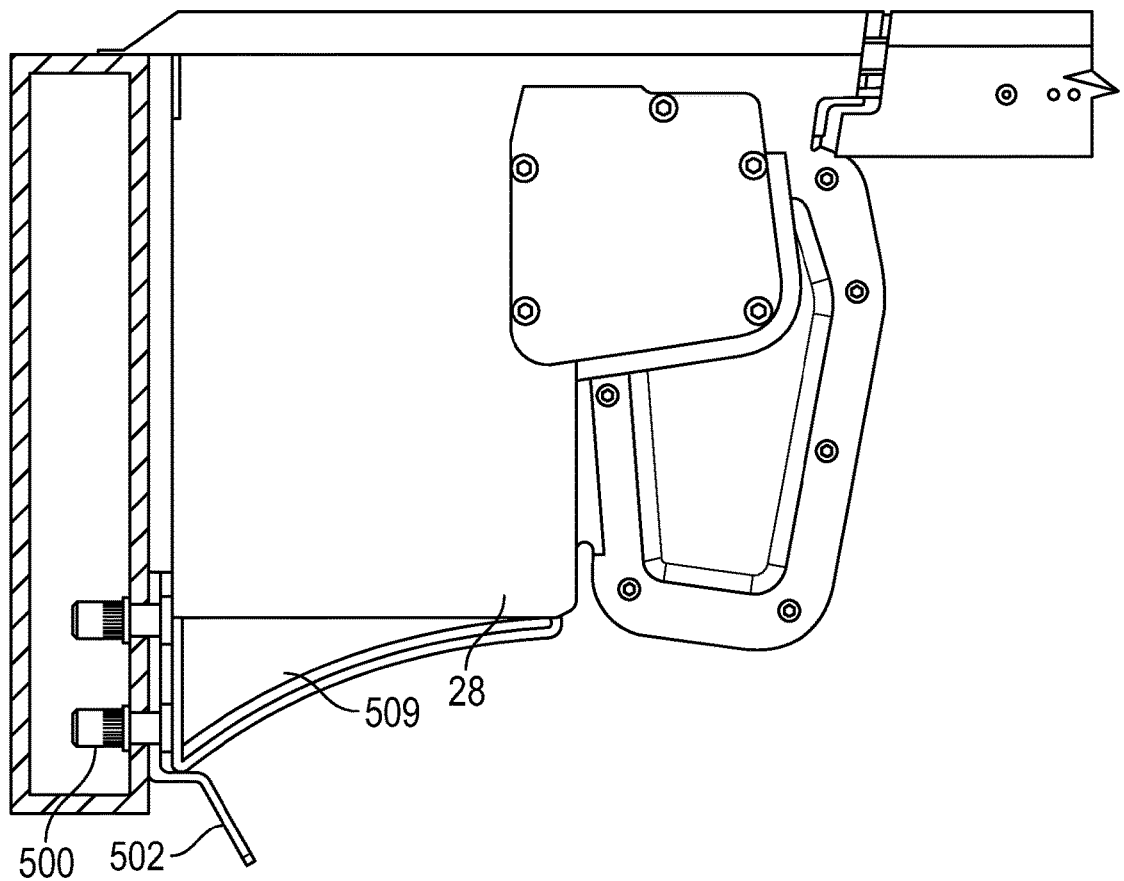
FIG. 8D illustrates an example magazine supported by the mounting brackets within the truck bed.
Figure 9:
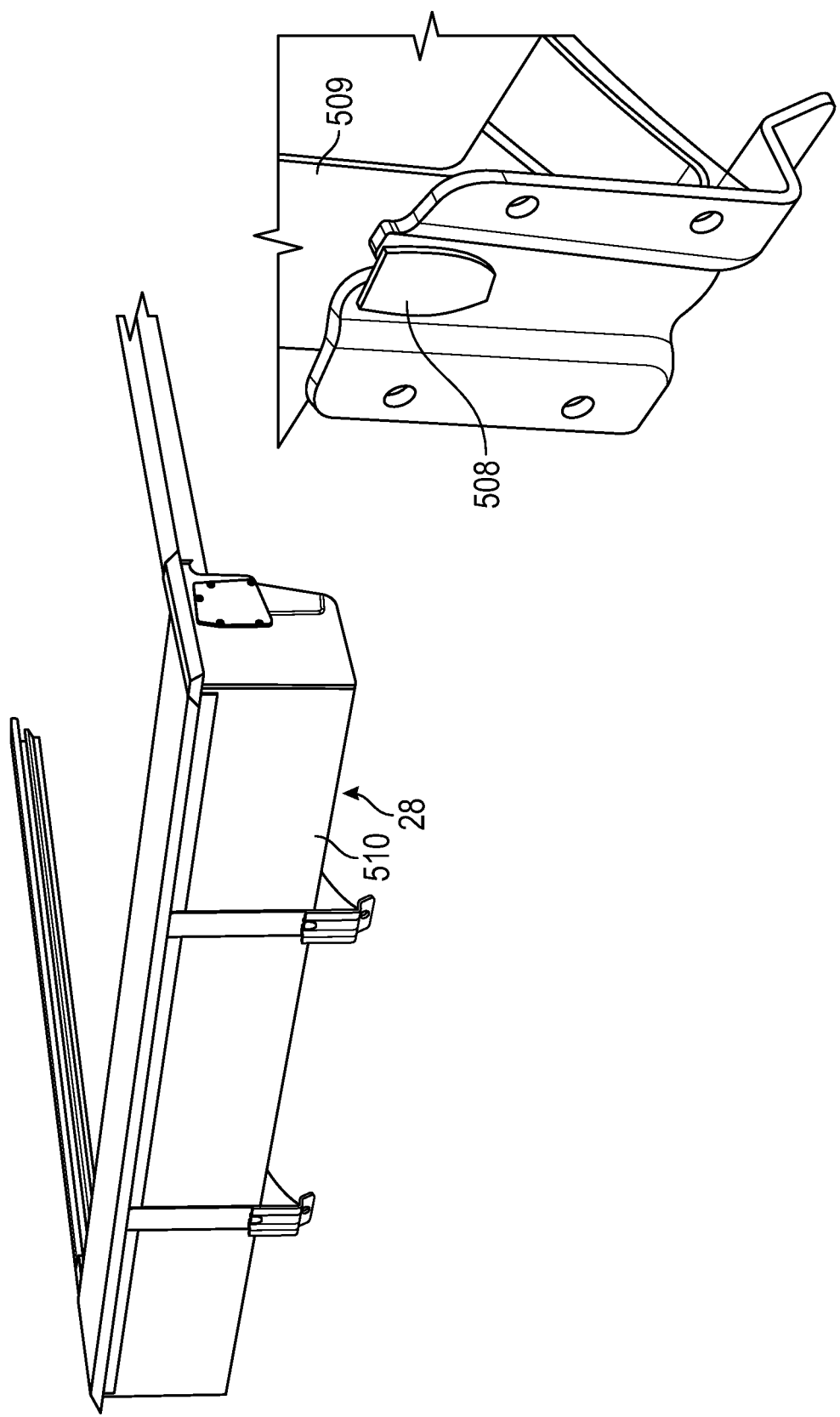
FIG. 9 are views illustrating the magazine supported by the mounting bracket.

Referring to FIGS. 8A-9, the magazine 28 may be mounted to a truck bed using brackets 502 secured to the truck bed with rivet nuts 500 (e.g., RIVNUTS). The brackets 502 may include an aperture 504 that may be used as tie-down. The brackets 502 include a slot 506 that receives a tab 508 extending from a bracket 509 on the magazine 28.

Figure 10B:
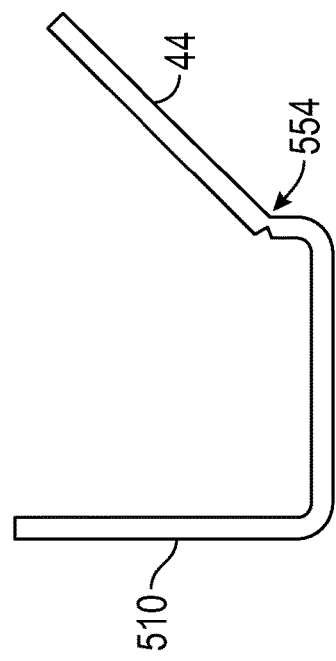
FIG. 10B illustrates the access cover partially opened and pivoting about a living hinge.
Figure 10A:
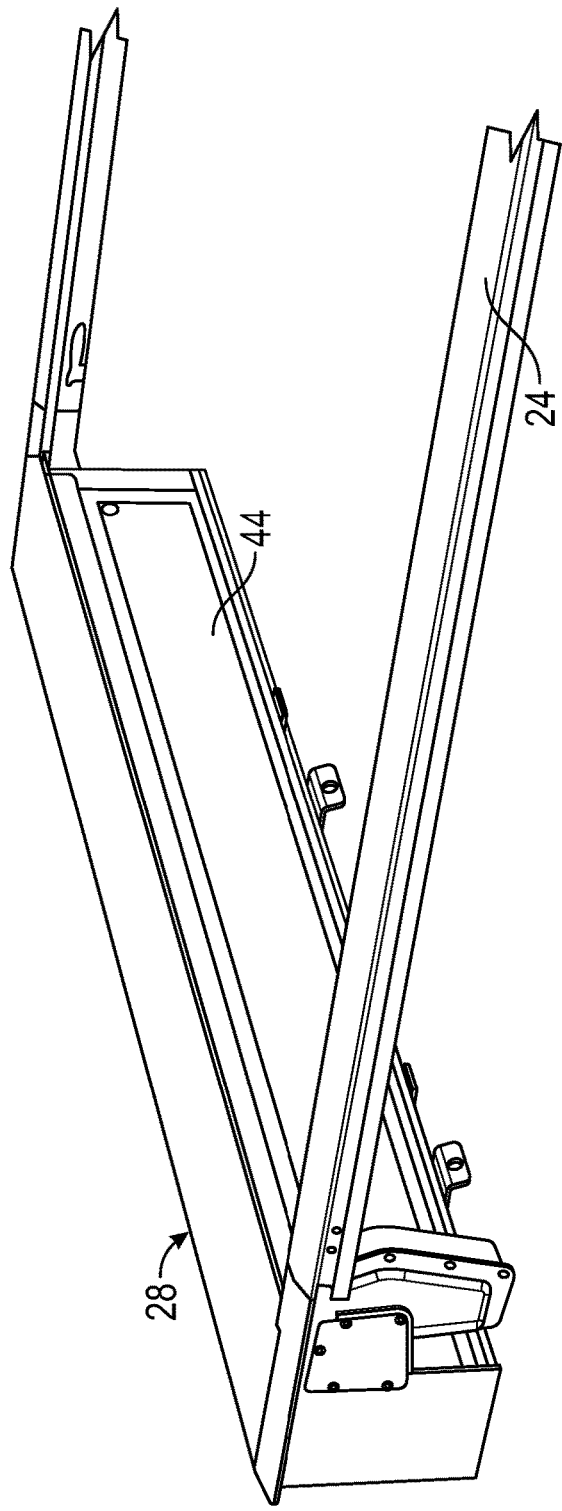
FIG. 10A illustrates another example magazine with an integrated access cover.
Figure 11A:
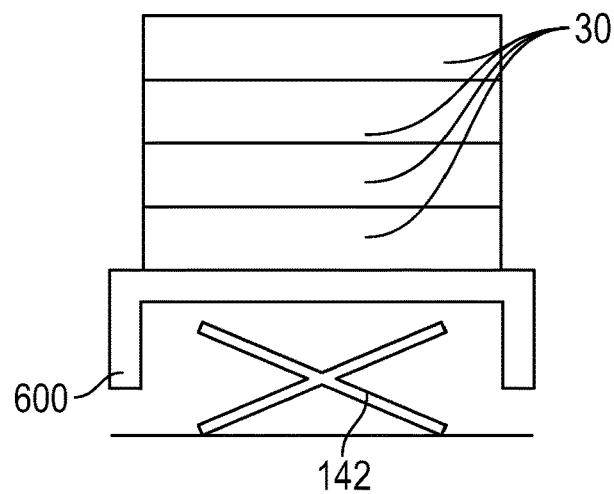
FIGS. 11A-11C depict a follower for supporting the slats within the magazine.
Figure 11B:
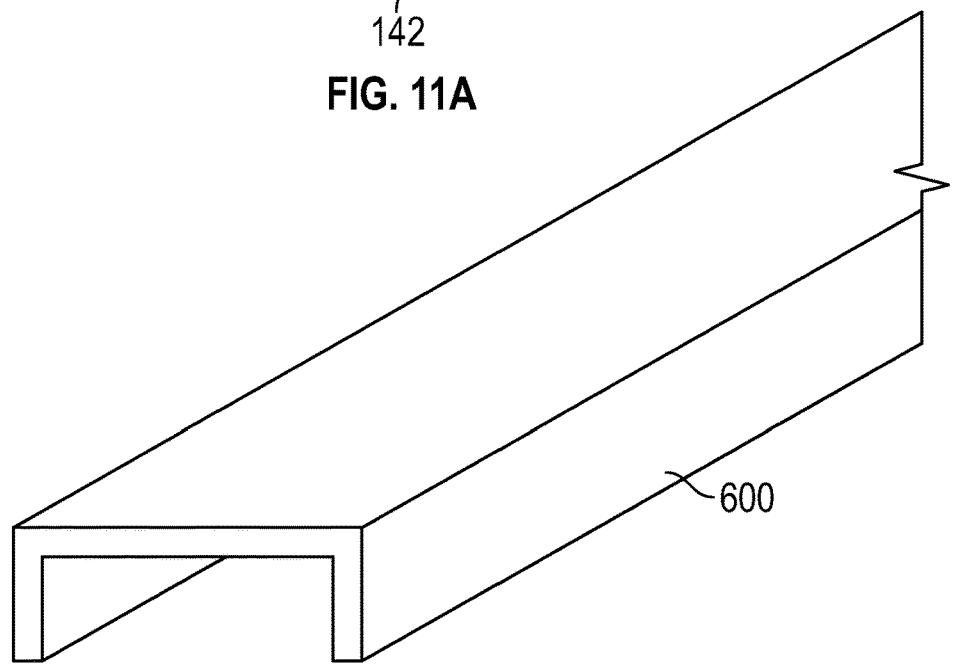
Figure 11C:
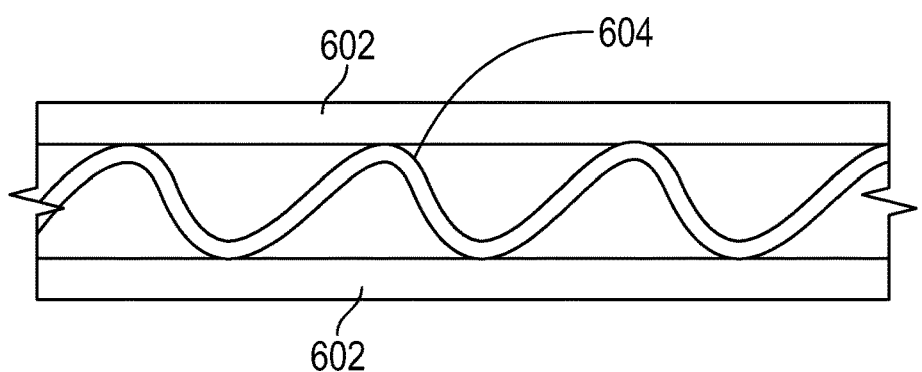

Referring to FIGS. 10A and 10B, light weight structures may be incorporated to reduce the overall weight of the cover system 20. An outer housing 510 of the magazine 28 may be provided by a plastic or AZDEL (a polypropylene with 50% glass reinforcement) structure for light weight. For example, an access cover 44 also may be constructed from plastic or AZDEL and secured to the outer housing 510 by a living hinge 554. A light weight follower 600 may also be used, as illustrated in FIGS. 11A-11C. The follower 600 supports the slats 30 and cooperates with the spring 142. The follower 600 may be provided by a light weight structure comprising outer walls 602 interconnected by a corrugated element 604, for example, as shown in FIG. 11C.

Figure 12A:
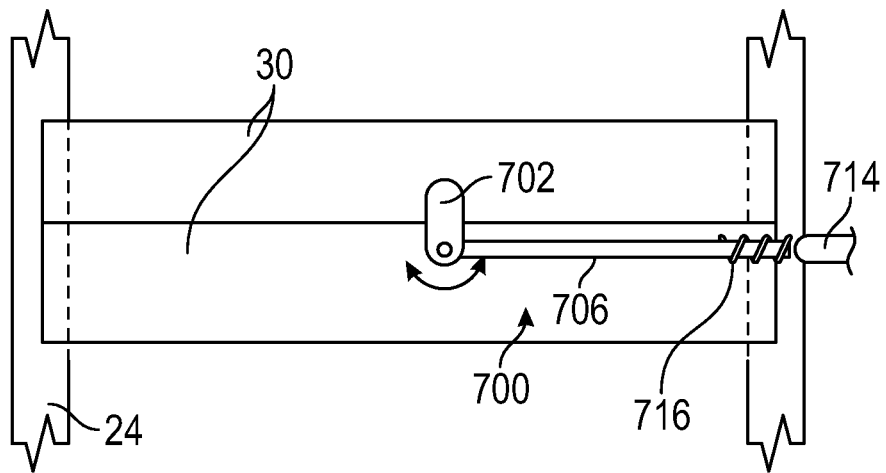
FIGS. 12A-12C respectively illustrate an example reinforcing mechanism for further securing the adjacent slats to one another.
Figure 12B:
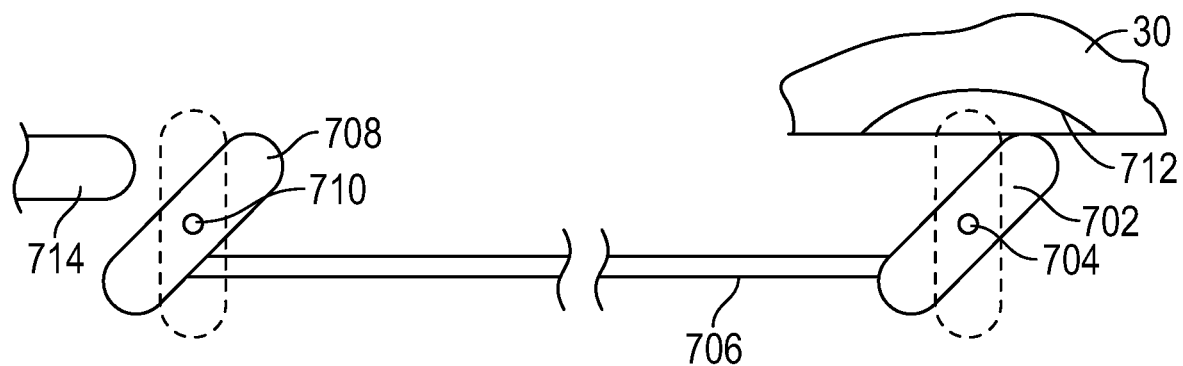
Figure 12C:
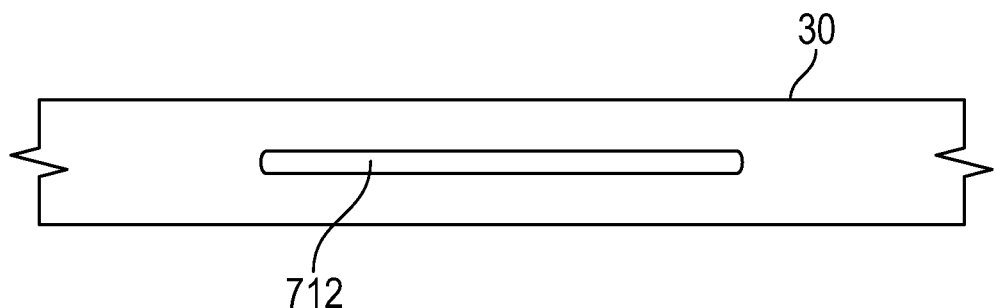

FIGS. 12A-12C illustrate a reinforcing mechanism 700 that interlocks the slats 30 to one another at or near the midpoint of the slats 30 between the rails 24. This better secures the slats 30 to one another so they cannot be decoupled from one another when a large load is applied to the slats, which provides improved security and structural integrity of the cover.

In one example, a cam 702 is rotatable about a pivot point 704. The cam 702 is connected to a lever 708 by a rod 706. The cam 702 moves into and out of engagement with a slot 712 in the adjacent slat 30 to selectively lock and unlock adjacent slats 30 to one another. The lever 704 is actuated by an element 714 arranged in the track 24, for example, and that cooperates with the lever 708 to rotate it about a pivot point 710. In one example, the element 714 is a magnet that cooperates with the lever 708 as it passes the element 714 along the rail 24. In another example, the element 714 be a ramped surface that may engage the lever 708 or an end of the rod 706. A spring 716 biases the cam 702 to an unlocked position.

Figure 13:
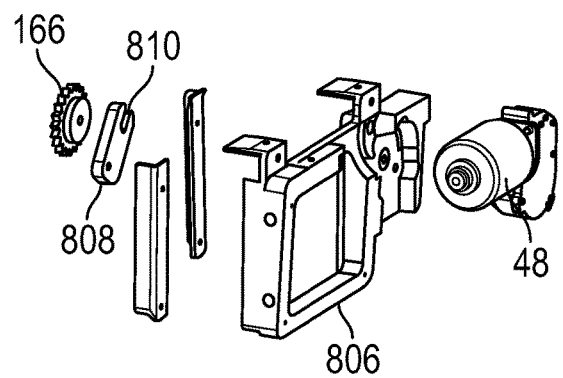
FIG. 13 illustrates another example release mechanism.

Another example release mechanism is shown in FIG. 13. The release mechanism includes a spacer 808 configured to maintain the first gear 166 in the coupled position with the gear 74 (FIG. 3A). The spacer 808 includes a slot 810 configured to receive the drive shaft 148 (FIG. 4B) of the motor 48 in an installed position. The slot 810 enables the spacer 808 to be slidingly removed away from the drive shaft 148 to an uninstalled position. Once the spacer 808 is manually removed, the first gear 166 can be manually moved axially toward the end cap 806 to the decoupled position in which the first gear 166 occupies the location wherein the spacer 808 was when in the installed position.

Figure 14:
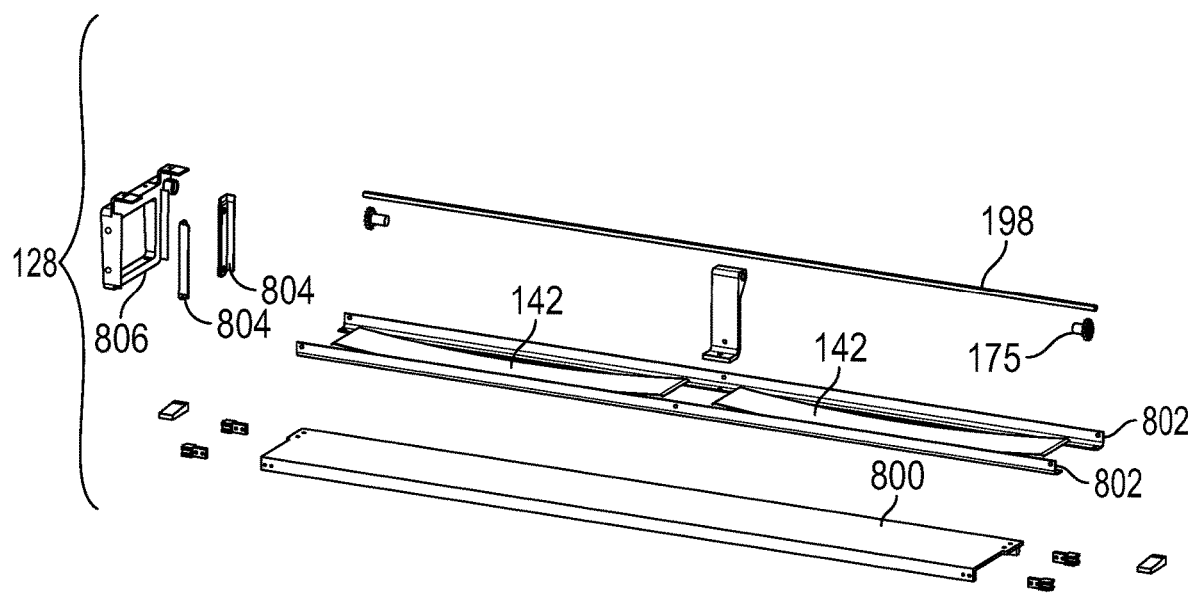
FIG. 14 depicts another example magazine.

FIG. 14 illustrates a simplified magazine 128, which may be suitable for inserting into an enclosed truck bed cavity. The rod 198 and its second gears 175 are supported for rotation between end caps 806. Rails 802 are secured between the end caps 806. Clamps (not shown) secure the center of each leaf spring 142 to the rails 802. The follower 800 supports the slats 30 and is arranged on top of the leaf springs 142, although the follower 800 is shown below the leaf springs 142 for clarity. Vertical slides 804 are mounted to the end caps 806 to provide low friction sliding surfaces for the slats 30.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A retractable cover system comprising:
   laterally spaced apart guide rails defining an opening and each providing a track;
   a drive assembly includes a motor driving a first gear, the first gear coupled to a second gear;
   a cover has multiple slats configured to interlock with one another in a deployed configuration, the slats cooperating with the drive assembly and slidable in the tracks between first and second positions within the opening in response to actuation of the drive assembly, the slats stacked onto one another in a stowed configuration, wherein the slats are configured to interlock with one another in the deployed configuration, all of the slats of the cover each have an aft edge and a forward edge, the aft edge of one slat interlocking with a forward edge of an adjacent slat in the deployed position, the slats stacked onto one another in a stowed configuration, wherein all the forward edges are arranged on one side of the stack of slats in the stowed configuration, and all of the aft edges are arranged on another side of the stack of slats in the stowed configuration, the one side opposite the other side;
   a release mechanism that cooperates with the drive assembly, wherein the cover is configured to operate manually with the release mechanism in a disengaged position that moves the first and second gears to the decoupled position, the motor coupled to the slats with the first and second gears in the coupled position for automated operation, and the motor disconnected to the slats with the first and second gears in the decoupled position for manual operation, wherein the disengaged position of the release mechanism enables the slats to be manually stacked and unstacked relative one another; and
   a spacer configured to maintain the first gear in the coupled position, the spacer includes a slot configured to receive a drive shaft of the motor in an installed position, the slot enabling the spacer to be slidingly removed away from the drive shaft to an uninstalled position, the first gear axially movable to the decoupled position in which the first gear occupies the location wherein the spacer was when in the installed position.

2. The retractable system of claim 1, wherein the second gear engages an underside of the slat, and the first gear is axially movable between the coupled and decoupled positions.

3. The retractable system of claim 2, wherein the underside includes a finger cup configured for use in sliding the slats during manual operation.

4. The retractable system of claim 2, wherein the motor is configured to prevent manual operation of the cover with the first and second gears in the coupled position.

5. The retractable system of claim 2, wherein the second gear is axially affixed to a shaft that extends lateral to another second gear that engages the underside of an opposite end of the slat.

6. The retractable system of claim 1, wherein the release mechanism includes a handle operatively connected to a lug that supports the first gear on a drive shaft of the motor, the release mechanism configured to slide the first gear out of engagement with a second gear to the decoupled position in response to an input from the handle.

7. The retractable system of claim 6, wherein release mechanism includes a spring that biases the first gear to the coupled position during automated operation.

8. The retractable system of claim 7, wherein the spring engages the handle.

9. A retractable cover system comprising:
   laterally spaced apart guide rails defining an opening and each providing a track;
   a drive assembly includes a motor driving a first gear, the first gear coupled to a second gear;
   a cover has multiple slats configured to interlock with one another in a deployed configuration, the slats cooperating with the drive assembly and slidable in the tracks between first and second positions within the opening in response to actuation of the drive assembly, the slats stacked onto one another in a stowed configuration, wherein the adjacent slats have complementarily shaped interlocking profiles;

a reinforcing mechanism different than the profiles and movable between locked and unlocked positions with the profiles interlocked, the locked position configured to lock adjacent slats to one another, the reinforcing mechanism maintaining engagement between the profiles in the locked position.

10. The retractable cover system of claim 9, wherein one of the adjacent slats has a slot, and the other of the adjacent slats has a cam rotatable about a pivot to be selectively disposed within the slot between the locked and unlocked positions.

11. The retractable cover system of claim 10, wherein the cam is pivotally connected to a rod, the rod is movable in response to an input from an element that cooperates with a rod.

12. The retractable cover system of claim 11, wherein a lever is connected to the rod, the element cooperates with the rod via the lever.

13. The retractable cover system of claim 11, wherein the element is a magnet, the magnet cooperates with the rod to move the cam to the locked position when the slat is aligned with the magnet.

14. The retractable cover system of claim 11, wherein the element is located within the track.

15. The retractable cover system of claim 14, wherein the element is a ramped surface that cooperates with an end of the rod.

16. The retractable cover system of claim 9, wherein a spring returns the reinforcing mechanism from the locked position to the unlocked position.

17. A retractable cover system comprising:
laterally spaced apart guide rails defining an opening and each providing a track;
a drive assembly includes a motor driving a first gear, the first gear coupled to a second gear;
a cover has multiple slats configured to interlock with one another in a deployed configuration, the slats cooperating with the drive assembly and slidable in the tracks between first and second positions within the opening in response to actuation of the drive assembly, the slats stacked onto one another in a stowed configuration;
a floor supporting a leaf spring biasing the slats upward toward the tracks; and
a spring-biased pulley system configured to cooperate with the floor and assist the leaf spring in biasing the slats relative to the tracks.

18. The retractable cover system of claim 17, wherein one of the first and second gears is axially movable relative to the other of the first and second gears between coupled and decoupled positions, the motor coupled to the slats with the first and second gears in the coupled position for automated operation, and the motor disconnected to the slats with the first and second gears in the decoupled position for manual operation.

19. A method of retracting a tonneau cover, comprising the steps of:
actuating a release device by pushing a handle; and
decoupling the tonneau cover from a drive mechanism that is in a deployed configuration in response to the actuating step, wherein the decoupling step includes decoupling an electric motor from a gear by disengaging a driven lug from a drive lug along an axis about which the gear is coaxial; and
wherein the slats are configured to interlock with one another in the deployed configuration, all of the slats of the cover each have an aft edge and a forward edge, the aft edge of one slat interlocking with a forward edge of an adjacent slat in the deployed position, the slats stacked onto one another in a stowed configuration, wherein all the forward edges are arranged on one side of the stack of slats in the stowed configuration, and all of the aft edges are arranged on another side of the stack of slats in the stowed configuration, the one side opposite the other side.

* * * * *